(12) United States Patent
Bowe

(10) Patent No.: US 6,235,814 B1
(45) Date of Patent: May 22, 2001

(54) USE OF POLYMERS IN MASONRY APPLICATIONS

(75) Inventor: Michael Damian Bowe, Newtown, PA (US)

(73) Assignee: Rohm and Haas Company, Phila., PA (US)

( * ) Notice: Subject to any disclaimer, the term of this patent is extended or adjusted under 35 U.S.C. 154(b) by 0 days.

(21) Appl. No.: 09/428,779

(22) Filed: Oct. 28, 1999

Related U.S. Application Data

(60) Provisional application No. 60/106,948, filed on Nov. 4, 1998.

(51) Int. Cl.[7] ................................................. C04B 24/26
(52) U.S. Cl. ................................................................. 524/5
(58) Field of Search ...................................... 524/5

(56) References Cited

U.S. PATENT DOCUMENTS

| | | | |
|---|---|---|---|
| 4,141,755 | 2/1979 | Weiss et al. | 52/517 |
| 4,762,867 | 8/1988 | Flodin et al. | 524/5 |
| 5,041,475 * | 8/1991 | Kambayashi et al. | 524/5 |
| 5,092,933 * | 3/1992 | Okamoto et al. | 524/5 |
| 5,521,266 | 5/1996 | Lau | 526/200 |
| 5,539,021 | 7/1996 | Pate et al. | 523/335 |

* cited by examiner

*Primary Examiner*—Peter Szekely
(74) *Attorney, Agent, or Firm*—Gary D. Greenblatt

(57) ABSTRACT

The use of polymers in masonry applications such as cement modifiers, cement roof tile modifiers, cement roof tile slurry coatings, and cement roof tile coatings is disclosed. The compositions utilized provide improved water absorption and water vapor transmission rates as well as improved flexural strength.

13 Claims, No Drawings

USE OF POLYMERS IN MASONRY APPLICATIONS

This Appln claims the benefit of Provisional No. 60/106,948 filed Nov. 4, 1998.

This invention relates to the use of polymers as modifiers or coatings in masonry applications.

Masonry refers to bound aggregates such as clay or bricks, cinder blocks, slag blocks, concrete blocks, blocks made from other aggregates, concrete, cement or stone walls, glazed bricks, glazed ceramic tile, marble, limestone, buildings of masonry construction, masonry curbs, blocks made from small stones, stucco, mortar, concrete roof tiles, slurry coats for concrete roof tiles, cement blocks, or masonry walls or ceilings. Masonry is made from solid particles (aggregate), water, and air. One requirement of masonry is that it has flexural strength. By flexural strength is meant that the masonry does not break or crack too readily when stressed. Another requirement of masonry is that it be water resistant. This is because a high amount of water absorption will weaken the masonry and lead to cracking.

It is known to admix polymers with masonry in order to improve permanence and reduce water absorption. U.S. Pat. No. 4,762,867 discloses the use of a copolymer containing from 1 to 15% of a hydrophobic monomer in cement mortar and concrete applications, where stearyl methacrylate is the preferred hydrophobic monomer. Copolymers containing 5% of a hydrophobic monomer are exemplified being admixed with the cement mortar. The use of the copolymer is taught to provide mortar or concrete with reduced water absorption and improved permanence.

Polymers have also been used to protect masonry surfaces from graffiti. U.S. Pat. No. 4,141,755 discloses the use of copolymers containing from 50 to 98% hydroxyalkyl (meth)acrylate and from 2 to 50% stearyl (meth)acrylate for sealing and coating building materials. The copolymer coating is taught to be useful for dirt pick up resistance and enabling the clean up of graffiti. The coating prevents the graffiti from penetrating the pores of the masonry. Instead, the graffiti is applied to the coating, which can be cleaned with a solvent. The copolymer coating however, is also taught to be moisture vapor permeable. Moisture vapor permeability may lead to the building material taking up water, which may weaken the building material.

Despite these disclosures, we have found that the use of a polymer containing from 20 to 100% by weight of a hydrophobic monomer as a masonry modifier provides increased flexural strength and water resistance to the masonry. We have also found that the use of a polymer containing from 20 to 100% by weight of a hydrophobic monomer as a masonry coating provides improved water resistance to the masonry. The hydrophobic monomer is present as polymerized units within the polymer. This polymer which provides flexural strength and improved water resistance when admixed with masonry and water resistance when applied as a coating on masonry has the added benefit of requiring only one polymer to modify the masonry in the place of two polymers.

The present invention provides a method of modifying a masonry composition comprising: treating the masonry composition with a polymer wherein the polymer comprises as polymerized units: a) from 20 to 100 parts by weight of at least one $C_{12}$ to $C_{40}$ alkyl ester of (meth)acrylic acid, b) from 0 to 80 parts by weight of at least one ethylenically unsaturated monomer, and c) from 0 to 80 parts by weight of at least one ethylenically unsaturated acid containing monomer or salts thereof, provided that when the at least one ethylenically unsaturated monomer is selected from hydroxyethyl (meth)acrylate and hydroxypropyl (meth)acrylate, the combined total level of hydroxyethyl (meth)acrylate and hydroxypropyl (meth)acrylate ranges from 0 to 40 parts by weight.

The present invention also provides a composition containing masonry and the polymer described above. The polymer may be dispersed throughout the masonry, dispersed throughout a slurry coating on the masonry, coated on the surface of the masonry or any combination thereof.

As used throughout this specification, by (meth)acrylic is meant either acrylic or methacrylic and by (meth)acrylate is meant either acrylate or methacrylate.

The polymer used in this invention may be prepared by a single stage or multi-stage process. The process may be an emulsion polymerization. See U.S. Pat. No. 5,521,266 for a detailed description of emulsion polymerization processes. The process may also be solution polymerization followed by emulsification. See U.S. Pat. No. 5,539,021 for detailed descriptions of a solution polymerization followed by mini-emulsion polymerization or micro-emulsion polymerizations. The emulsion polymerization process of U.S. Pat. No. 5,521,266 is preferred. In the process utilized for preparing the samples within this application, a first stage was prepared by adding a monomer emulsion and sodium persulfate to a solution containing methyl-p-cyclodextrin ("CD"), deionized water, and surfactant. The first stage was reacted at 85° C. A second stage was prepared by making a second monomer emulsion and feeding the second monomer emulsion and a sodium persulfate solution to the reacted first stage. The second stage was reacted at 85° C.

The polymer used in this invention is a composition which contains as polymerized units from 20 to 100 parts by weight, preferably from 30 to 100 parts by weight, more preferably 40 to 100 parts by weight of at least one $C_{12}$ to $C_{40}$ alkyl ester of (meth)acrylic acid (also referred to as a hydrophobic monomer). It is further preferred that the polymer used in this invention contains as polymerized units from 30 to 96 parts by weight, more preferably 40 to 93 parts by weight of at least one $C_{12}$ to $C_{40}$ alkyl ester of (meth)acrylic acid. It is preferred that the alkyl ester of (meth)acrylic acid be a $C_{16}$ to $C_{30}$ alkyl ester of (meth)acrylic acid. It is more preferred that the alkyl ester of (meth)acrylic acid be a $C_{16}$ to $C_{18}$ alkyl ester of (meth)acrylic acid. Suitable alkyl esters of (meth)acrylic acid include cetyl (meth)acrylate, stearyl (meth)acrylate, behenyl (meth)acrylate, and eicosyl (meth)acrylate. Beneficial properties may be obtained by utilizing more than one $C_{12}$ to $C_{40}$ alkyl ester of (meth)acrylic acid.

The polymer used in this invention may also contain as polymerized units from 0 to 80 parts by weight, preferably 0 to 50 parts by weight, more preferably 1 to 20 parts by weight of at least one ethylenically unsaturated monomer. Suitable ethylenically unsaturated monomers for use in the preparation of the polymer compositions of this invention include, but are not limited to (meth)acrylic ester monomers including methyl acrylate, ethyl acrylate, butyl acrylate, 2-ethylhexyl acrylate, decyl acrylate, methyl methacrylate, and butyl methacrylate; acrylamide or substituted acrylamides; styrene or substituted styrene; vinyl acetate or other vinyl esters; vinyl monomers such as vinyl chloride, vinylidene chloride, N-vinyl pyrolidone; and acrylonitrile or methacrylonitrile. Butyl acrylate, methyl methacrylate, and styrene are preferred. More preferred are butyl acrylate and methyl methacrylate.

The ethylenically unsaturated monomer may be selected from hydroxyethyl (meth)acrylate and hydroxypropyl (meth)acrylate. When hydroxyethyl (meth)acrylate and hydroxypropyl (meth)acrylate are present in the polymer used in this invention, they are present as polymerized units at combined total levels ranging from 0 to 40 parts by weight, preferably 0 to 20 parts by weight, more preferably 0 to 10 parts by weight.

The polymer used in this invention may also contain as polymerized units from 0 to 80 parts by weight, preferably 0 to 50 parts by weight, more preferably 1 to 15 parts by weight ethylenically unsaturated acid containing monomer or salts thereof. Suitable ethylenically unsaturated acid containing monomers include, but are not limited to acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride. Acrylic acid and methacrylic acid are preferred. Methacrylic acid is more preferred.

The polymer used in this invention may also contain as polymerized units from 0 to 80 parts by weight, preferably 0 to 50 parts by weight, more preferably 1 to 15 parts by weight of a fluorinated (meth)acrylate ethylenically unsaturated monomer, such as Zonyl™ (Trademark of DuPont Chemical Company) products.

The polymer used in this invention may also contain as polymerized units from 0 to 80 parts by weight, preferably 0 to 50 parts by weight, more preferably 1 to 15 parts by weight of a silicone containing ethylenically unsaturated monomer, such as vinyl trimethoxy silane and methacryloxy propyl trimethoxy silane.

The polymer used in this invention may also contain as polymerized units from 0 to 80 parts by weight, preferably 0 to 50 parts by weight, more preferably 1 to 15 parts by weight of a monomer selected from $C_6$–$C_{20}$ alkyl styrene and alkyl-alpha-methyl styrene, $C_6$–$C_{20}$ alkyl dialkyl itaconate, $C_{10}$–$C_{20}$ vinyl esters of carboxylic acids, $C_8$–$C_{20}$ N-alkyl acrylamide and methacrylamide, $C_{10}$–$C_{20}$ alkyl alpha-hydroxymethylacrylate, $C_8$–$C_{20}$ dialkyl 2,2'-(oxydimethylene) diacrylate, $C_8$–$C_{20}$ dialkyl 2,2'-(alkyliminodimethylene)diacrylate, $C_8$-$C_{20}$ N-alkylacrylimide, and $C_{10}$–$C_{20}$ alkyl vinylether.

The polymer used in this invention may be used to protect or modify masonry by treating the masonry with the polymer. By treating is meant admixing the polymer with masonry, admixing the polymer with a slurry coating for the masonry and applying the slurry coating to the masonry, coating masonry with the polymer or any combination thereof. It is not necessary for each layer of a masonry substrate to be treated. For example, a roof tile may be modified by admixing the polymer with the masonry used to prepare the roof tile; the slurry coating applied to the roof tile may not be modified with the polymer; and a coating of the polymer may be applied to the slurry coating on the roof tile.

When the polymer is to be used in an admixture with masonry, the polymer may be admixed with the masonry at from 0.1 to 20%, preferably 0.2 to 10% by weight on the total weight of the masonry.

When the masonry is a slurry coat for a concrete roof tile, the slurry coat may be prepared by admixing cement, fillers such as sand or calcium carbonate, inorganic pigments such as black iron oxide, red iron oxide or mixtures thereof, organic pigments such as phthallocyanine, polymers such as the polymers utilized in this invention, and water. Based on 100 parts by weight cement, a typical slurry coat formulation may contain from 0 to 150 parts by weight filler, 1 to 15 parts by weight pigment, 3 to 15 parts by weight polymer, and 30 to 70 parts by weight water.

For coating purposes, the polymer may be applied at from 1 $g/m^2$ to 50 $g/m^2$, preferably 5 $g/m^2$ to 20 $g/m^2$ to yield a wet thickness of from 15 microns to 150 microns, preferably 20 microns to 75 microns. The coating may be applied by brush application, dipping, or spraying. The polymer is then dried. The polymer may be dried under ambient conditions. Forced air may be utilized to aid in the drying of the polymer. Heat may also be utilized in the drying of the polymer. The forced air may be heated, or the polymer coated substrate may be placed in a heated oven. The temperature of the heat may range from 35° C. to 200° C. Other methods that may be utilized in drying the polymer include infrared drying and ultra violet drying.

The following abbreviations are used in Examples throughout this patent application:

SMA=stearyl methacrylate
MAA=methacrylic acid
MMA=methyl methacrylate
BA=butyl acrylate
CD=methyl-β-cyclodextrin
Flex=flexural strength ($kg/m^2$)

EXAMPLE 1

For stage 1, 400 g deionized water, Triton® XN-45S (Trademark of Union Carbide Chemical Company) anionic surfactant (mixture of ammonium nonylphenoxy polyethoxy sulfate and monoethanol ammonium alkylphenoxy polyethoxy sulfate), and 28.6 g CD were introduced into a 4-liter round bottom flask with four necks equipped with a mechanical stirrer, temperature control device, condenser, monomer and initiator feed lines, and a nitrogen inlet at room temperature. The contents were heated to 85° C. while stirred under a nitrogen purge. A monomer emulsion was prepared separately. Solutions of 0.35% by weight sodium carbonate (based on the total monomer weight in stage 1 and stage 2) in 25 g deionized water and 0.35% by weight sodium persulfate (based on the total monomer weight in stage 1 and stage 2) in 30 g deionized water were introduced into the reaction kettle. The monomer emulsion was fed over a period of 20 minutes together with an initiator solution of 0.05% sodium persulfate (based on the total monomer weight in stage 1 and stage 2) in 210 g deionized water.

For stage 2, a second monomer emulsion was prepared using 625 g deionized water, 7.8 g Triton® XN-45S anionic surfactant, and monomers. Immediately after the end of the stage 1 monomer emulsion feed, the stage 2 monomer emulsion was fed over a period of 3 hours together with the sodium persulfate initiator solution. The monomers of the first and second monomer emulsions were selected such that the polymer of Table 1 (based on weight percent monomer) was obtained.

TABLE 1

| Sample | SMA | BA | MMA | MAA |
|--------|-----|-----|-----|-----|
| 1 | 40 | 10 | 49 | 1 |

Concrete Modifier Test

A mortar was prepared by admixing 300 parts by weight #45 sand, 100 parts by weight cement, and 10 parts by weight polymer Sample 1 (on a polymer solids basis). The water to cement ratio was 0.28. A second Sample was prepared using the same formulation as previously described, except that a polymer made of 50 BA/48.5 MMA/1.5 MAA was substituted for the polymer of Sample 1. The water to cement ratio was 0.35. A third Sample was prepared using the same formulation as previously described, except that no polymer was included in the formulation. The water to cement ratio was 0.45. All three of these mortars were made to the same consistency. The mortars were hand packed into 1.27 cm×1.91 cm×12.7 cm molds and cured in a constant temperature room for 2 weeks. Four bars of each mortar were prepared. The 3 point flexural strength of each sample was measured and the results were averaged. The results are shown in Table 2.

TABLE 2

| Polymer | Density | Flex (kg/m$^2$) |
| --- | --- | --- |
| None | 2.13 | 0.2932 |
| 50 BA/48.5 MMA/1.5 MAA* | 2.16 | 0.5326 |
| Sample 1 | 2.16 | 0.5282 |

*A polymer which may typically be used to modify mortar.

The data above demonstrates that the polymer used in this invention effectively increases the flexural strength of mortar when used as a mortar modifier. The mortar described above may be used to prepare concrete roof tiles.

A separate set of cured samples prepared as above was immersed in water for 48 hours and the water uptake was measured. The results are shown in Table 3.

TABLE 3

| Polymer | Water Uptake (%) |
| --- | --- |
| None | 4.3 |
| 50 BA/48.5 MMA/1.5 MAA* | 2.4 |
| Sample 1 | 1.1 |

*A polymer which may typically be used to modify mortar.

The data above demonstrates that the polymer used in this invention effectively increases the water resistance of mortar when used as a mortar modifier, even after immersing the mortar in water for 48 hours.

Roof Tile Slurry Coating Test

Fresh concrete samples were prepared to simulate roof tile bodies. The concrete was prepared by admixing 750 parts by weight #45 sand, 250 parts by weight type 1 cement, and 102 parts by weight water. The concrete was packed by hand into plastic petri dishes.

A roof tile slurry coating was prepared by admixing 20 parts by weight cement, 10 parts by weight #100 sand, 2 parts by weight black $Fe_2O_3$, 2 parts by weight polymer solid, and 3.5 parts by weight water. All polymers tested had 2% by weight Tergitol™15-S-40 (Trademark of Union Carbide Chemical Company) (ethoxylated $C_{12}$–$C_{14}$ secondary alcohols with average EO number of 40) post added. The dry ingredients were combined. The combined wet ingredients were then added and the admixture was mixed for 3 minutes. The slurries were then poured over the roof tiles. Enough of each slurry was poured over the roof tiles to provide a coating of from 0.5 to 1.0 mm. The coated roof tile was then cured for 3 hours at 50° C. and 90% humidity, then dried for 30 minutes at 50° C.

The slurry coated roof tiles were tested for water penetration by placing a drop of water onto the cured slurry surface and observing the sample over time, looking for the water to wick in to the roof tile. The results are shown in Table 4.

TABLE 4

| Polymer | Wick Time |
| --- | --- |
| None | <5 seconds |
| 44 BA/54.3 MMA/1.7 MAA* | 10–15 minutes |
| 39 EHA/59.3 MMA/1.7 MAA* | ~1 hour |
| Sample 1 | ~2 hours |

*A polymer which may typically be used to modify a roof tile slurry coating.

The data above demonstrates that the polymer used in this invention effectively increases the water resistance of roof tile slurry coatings when used as a roof tile slurry coating modifier.

Slurry Coated Roof Tile Coating Test

A slurry with no polymer modifier was prepared as described above and applied to a fresh concrete sample. Onto this slurry was sprayed enough polymer to provide a 30 to 40 micron thick film after drying (approximately 70 to 100 microns wet). The samples were cured as above, then stored at ambient conditions for 1 week. Samples were tested by the water penetration test described above. The results are shown in Table 5.

TABLE 5

| Polymer | Wick Time |
| --- | --- |
| 45.5 BA/53.2 MMA/1.3 MAA* | 2 hours |
| Sample 1 | >6 hours |

*A polymer which may typically be used as a roof tile slurry coating

The data above demonstrates that the polymer used in this invention effectively increases water resistance when used as a roof tile slurry coating.

What is claimed:

1. A method of modifying a masonry composition comprising:
   treating the masonry composition with a polymer;
   wherein a composition comprising the masonry composition and the polymer consists essentially of the masonry composition, the polymer, and optionally, at least one component selected from the group consisting of fillers, inorganic pigments, organic pigments, and water;
   wherein the polymer comprises as polymerized units: a) from 20 to 100 parts by weight of at least one $C_{12}$ to $C_{40}$ alkyl ester of (meth)acrylic acid, b) from 0 to 80 parts by weight of at least one ethylenically unsaturated monomer, and c) from 0 to 80 parts by weight of at least one ethylenically unsaturated acid containing monomer or salts thereof, provided that when the at least one ethylenically unsaturated monomer is selected from the group consisting of hydroxyethyl (meth)acrylate and hydroxypropyl (meth)acrylate, the combined total level of hydroxyethyl (meth)acrylate and hydroxypropyl (meth)acrylate ranges from 0 to 40 parts; and wherein the polymer is an emulsion polymer prepared by emulsion polymerization.

2. The method according to claim 1 wherein the masonry is treated by admixing the polymer with the masonry.

3. The method according to claim 1 wherein the masonry is treated by admixing the polymer with a slurry coating for the masonry and applying the slurry coating to the masonry.

4. The method according to claim 1 wherein the masonry is treated by applying a coating of the polymer to the masonry.

5. A composition consisting essentially of:

I) masonry; and

II) a polymer comprising as polymerized units: a) from 20 to 100 parts by weight of at least one $C_{12}$ to $C_{40}$ alkyl ester of (meth)acrylic acid, b) from 0 to 80 parts by weight of at least one ethylenically unsaturated monomer, and c) from 0 to 80 parts by weight of at least one ethylenically unsaturated acid containing monomer or salts thereof, provided that when the at least one ethylenically unsaturated monomer is selected from the group consisting of hydroxyethyl (meth)acrylate and hydroxypropyl (meth)acrylate, the combined total level of hydroxyethyl (meth)acrylate and hydroxypropyl (meth)acrylate ranges from 0 to 40 parts; and III) optionally, at least one component selected from the group consisting of fillers, inorganic pigments, organic pigments, and water;

wherein the polymer is an emulsion polymer prepared by emulsion polymerization.

6. An article consisting essentially of the composition of claim 5 wherein the masonry is concrete.

7. An article consisting essentially of the composition of claim 5 wherein the masonry is a concrete roof tile.

8. The composition according to claim 5 wherein the masonry is a slurry coated concrete roof tile.

9. The composition according to claim 5 wherein the masonry is a polymer coated, slurry coated concrete roof tile.

10. The method according to claim 1 wherein the polymer comprises as polymerized units 30 to 100 parts by weight of at least one $C_{12}$ to $C_{40}$ alkyl ester of (meth)acrylic acid.

11. The method according to claim 1 wherein the polymer is prepared in the presence of methyl-β-cyclodextrin.

12. The composition of claim 5 wherein the polymer comprises as polymerized units 30 to 100 parts by weight of at least one $C_{12}$ to $C_{40}$ alkyl ester of (meth)acrylic acid.

13. The composition of claim 5 wherein the polymer is prepared in the presence of methyl-β-cyclodextrin.

* * * * *